US012352106B2

(12) United States Patent
Fink, Jr.

(10) Patent No.: US 12,352,106 B2
(45) Date of Patent: Jul. 8, 2025

(54) SAFETY STEP LADDER WITH SUPPORTED REACH

(71) Applicant: William Fink, Jr., Glen Mills, PA (US)

(72) Inventor: William Fink, Jr., Glen Mills, PA (US)

( * ) Notice: Subject to any disclaimer, the term of this patent is extended or adjusted under 35 U.S.C. 154(b) by 910 days.

(21) Appl. No.: 17/524,134

(22) Filed: Nov. 11, 2021

(65) Prior Publication Data

US 2022/0154529 A1 May 19, 2022

Related U.S. Application Data

(60) Provisional application No. 63/115,141, filed on Nov. 18, 2020.

(51) Int. Cl.
*E06C 1/20* (2006.01)
*E06C 1/39* (2006.01)
*E06C 7/42* (2006.01)
*E06C 7/16* (2006.01)

(52) U.S. Cl.
CPC .................. *E06C 1/20* (2013.01); *E06C 1/39* (2013.01); *E06C 7/423* (2013.01); *E06C 7/16* (2013.01)

(58) Field of Classification Search
CPC ..... E06C 1/18; E06C 1/20; E06C 1/28; E06C 7/423
See application file for complete search history.

(56) References Cited

U.S. PATENT DOCUMENTS 2,172,860 A * 9/1939 Weaver .................... E06C 1/393 182/123
2,887,260 A * 5/1959 McKinnie ................. E06C 1/22 182/180.1
3,768,592 A * 10/1973 Higgins .................... E06C 1/16 248/238
4,483,415 A * 11/1984 Disston ..................... E06C 1/22 182/156
4,823,912 A 4/1989 Gould et al.
8,485,316 B2 * 7/2013 Vestal ........................ E06C 7/46 182/172
D722,181 S * 2/2015 Green ............................ D25/64
9,038,776 B2 * 5/2015 Green ........................ E06C 7/46 182/108
11,187,000 B2 * 11/2021 Neubauer ................. E04G 1/30
2019/0177987 A1 6/2019 Neubauer

FOREIGN PATENT DOCUMENTS

DE 2407317 A1 * 8/1975
DE 202012010211 U1 * 2/2013 ............... E06C 1/18
EP 1832709 A1 * 9/2007 ............... E06C 1/18
GB 1012669 A * 12/1965
WO WO-2021047691 A1 * 3/2021

* cited by examiner

*Primary Examiner* — Adriana Figueroa
(74) *Attorney, Agent, or Firm* — Wendy W. Koba

(57) ABSTRACT

A safety step ladder is formed of a climb leg and a support leg, and includes a specialized hinging arrangement to attach the support leg to the climb leg at a location below the midpoint of the climb leg such that the top portion of the climb leg somewhat overhangs the support leg. The specialized hinging arrangement is also configured so that the support leg is raised upward when closing against the climb leg (ensuring that in the closed position the support leg does not extend below the climb leg), providing a compact configuration for storage purposes.

8 Claims, 9 Drawing Sheets

SAFETY STEP LADDER WITH SUPPORTED REACH

CROSS-REFERENCE TO RELATED APPLICATIONS

This application claims the priority benefit of U.S. Provisional Application No. 63/115,141, filed Nov. 18, 2020 and herein incorporated by reference.

TECHNICAL FIELD

The present invention relates to a step ladder and, more particularly, to a step ladder having a specialized short leg (referred to at times hereafter as "support leg") that is hinged to a traditional leg (referred to at times hereafter as "climb leg") in a manner that allows for the climb leg to stably overhang the support leg and increase a user's reach in a safe manner for specific situations.

BACKGROUND OF THE INVENTION

Step ladders are made and used to enable a person to elevate himself so as to see or reach objects that are just out of range. The traditional step ladder has two sides that join at the top and are spread apart at the base creating a stable triangular form. The separation between the legs at the base is sufficient to at least have the termination of the legs beyond the steps (or rungs) upon which an individual may climb.

While extremely stable, this configuration results in situations where the "support side" of the ladder (i.e., the side opposite the "climbing side") comes up against an obstruction that limits the ability to place the ladder in the most convenient location (in terms of reaching the desired elevated location). Indeed, this situation results in a person simply unable to reach the object, or results in a person turning the ladder sideways with respect to the obstruction and leaning over the side of the ladder to extend his/her reach. This type of reach extension will move the person's center of gravity away from the center of the ladder and create an unstable arrangement and yet still not reach the desired location.

For example, when maintenance personnel are using a step ladder within an office facility, it is not uncommon for a desk, panel-mounted work surface, or the like, to present an obstruction that impedes the user's ability to reach a specific overhead light fixture or above-ceiling air conditioning system, or the like. FIG. 1 is a simplified drawing illustrating the problems associated with using a conventional step ladder 1 around obstacles, such as an office cubicle desk 2, as shown.

SUMMARY OF THE INVENTION

The needs remaining in the art are addressed by the present invention, which relates to a step ladder and, more particularly, to a step ladder having a specialized short leg (referred to at times hereafter as "support leg") that is hinged to a traditional leg (referred to at times hereafter as "climb leg") in a manner that allows for the climb leg to stably overhang the support leg and increase a user's reach in a safe manner for specific situations.

In particular, the inventive safety step ladder utilizes a specialized hinging arrangement to attach the support leg to the climb leg at a location below the midpoint of the climb leg such that the top portion of the climb leg somewhat overhangs the support leg. The specialized hinging arrangement is also configured so that the support leg is raised upward when closing against the climb leg (ensuring that in the closed position the support leg does not extend below the climb leg), providing a compact configuration for storage purposes.

An exemplary embodiment of the present invention may take the form of step ladder comprising a climb leg and a support leg coupled together via a specialized hinging arrangement. The climb leg is defined as having a top termination and an opposing ground termination, and includes a hinging position located closer to the ground termination than the top termination of a conventional ladder. The support leg is attached to the climb leg at the hinging position with the specialized hinging arrangement such that when fully extended by the specialized hinging arrangement the top portion of the climb leg overhangs a portion of the support leg.

Other and further embodiments and advantages of the present invention will become apparent during the course of the following discussion and by reference to the accompanying drawings.

BRIEF DESCRIPTION OF THE DRAWINGS

Referring now to the drawings, where like reference numerals represent like parts in several views:

FIG. 1 is a simplified side view of a prior art, conventional step ladder, illustrating its reach limitations when working around obstacles such as desks, tables, or the like;

DETAILED DESCRIPTION

Figure 2:
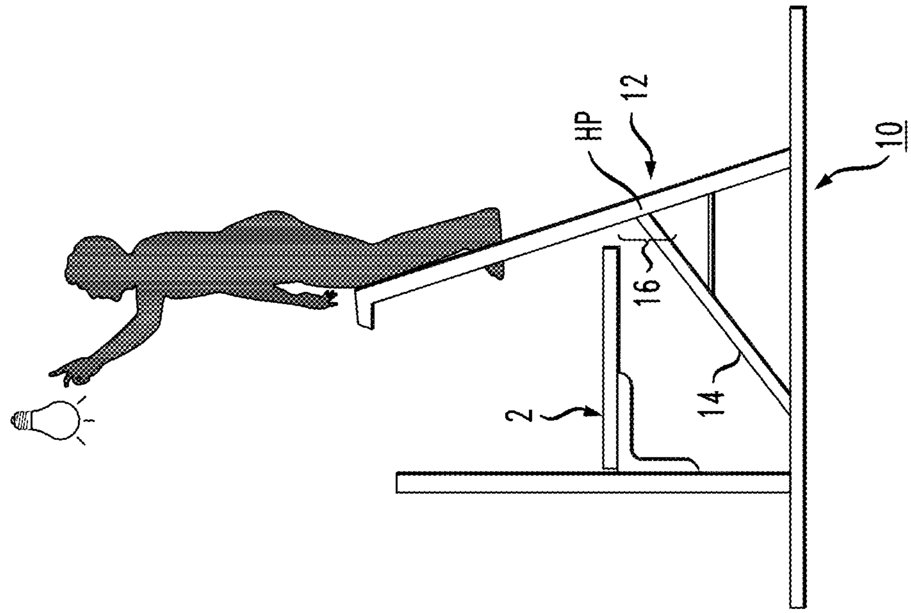
FIG. 2 is a simplified side view of an exemplary safety step ladder formed in accordance with the present invention, utilizing a support leg that is hinged to the climb leg at a location that allows for an upper portion of the climb leg to overhang the support leg in a manner that allows a user to safely reach out without being impeded by obstacles.
Figure 1:
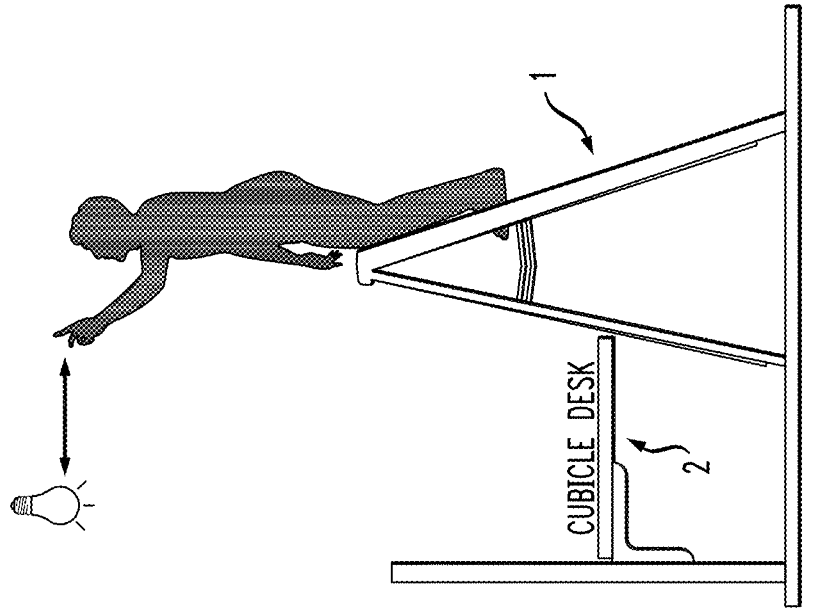
FIG. 1 PRIOR ART

As mentioned above, the safety step ladder of the present invention addresses the obstruction problems associated with conventional step ladders; namely, problems relating to the need to take into consideration various obstacles (tables, desks, chairs, etc.) when positioning the support leg side of the ladder. In particular, the inventive safety step ladder overcomes these concerns in the form of a step ladder having a specialized support leg that is hinged to a climb leg at a position below the midpoint of the climb leg, allowing for the support leg to fit below/underneath various obstacles that may be found in areas where step ladders are used. The configuration of the inventive safety step ladder results in an upper portion of the climb leg overhanging the support leg in a manner that increases a user's reach in a safe manner. FIG. 2 is a simplified side view of the inventive safety step ladder 10, as used instead of conventional step ladder 1 shown in FIG. 1. Safety step ladder 10 includes a climb leg 12 and a support leg 14, where support leg 14 is attached to climb leg 12 at a below-center hinge position HP via a specialized hinging arrangement 16 that will be discussed in detail below.

It is clearly shown in FIG. 2 that the configuration and location of support leg 14 with respect to climb leg 12 allows for a top region of climb leg 12 to overhang impediments (such as a desk) and allow for an individual to reach elements at the ceiling level without the need to move any furniture (saving time and expense). When used in an office setting, the hinge position is preferably chosen such that support leg 14 fits under common objects such as desks, tables and the like As will also be discussed in detail below in accordance with FIGS. 6-9, specialized hinging arrangement 16 is further configured in a manner that allows for support leg 14 to be drawn up against climb leg 12 when not in use without extending below the termination of climb leg 12 (which is considerably longer than support leg 14), providing a compact configuration for storage purposes.

Figure 3:
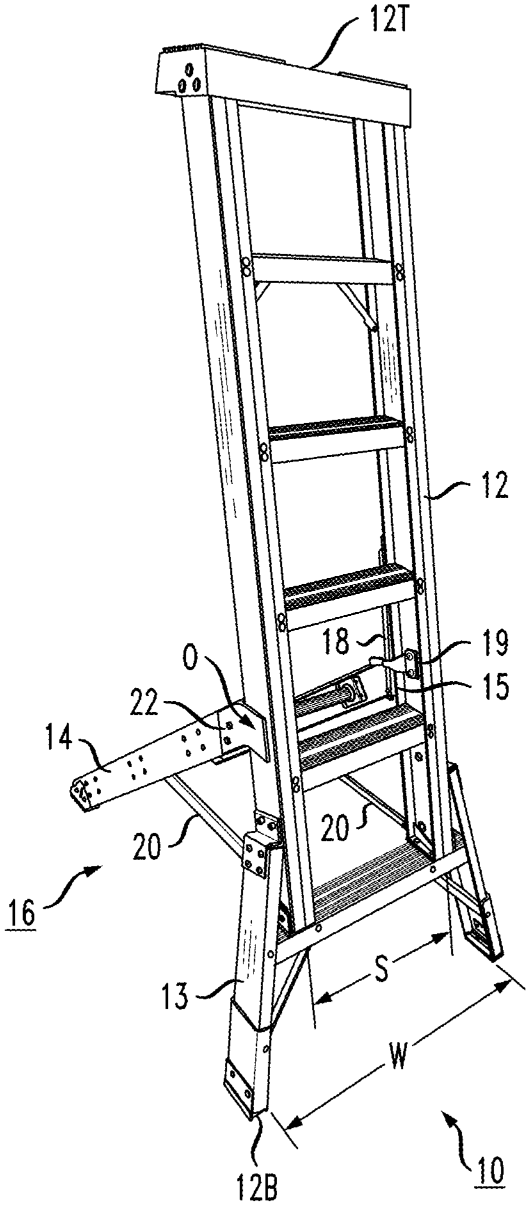
FIG. 3 is a side isometric view of the inventive safety ladder in its open position, this view from the climb leg perspective.
Figure 4:
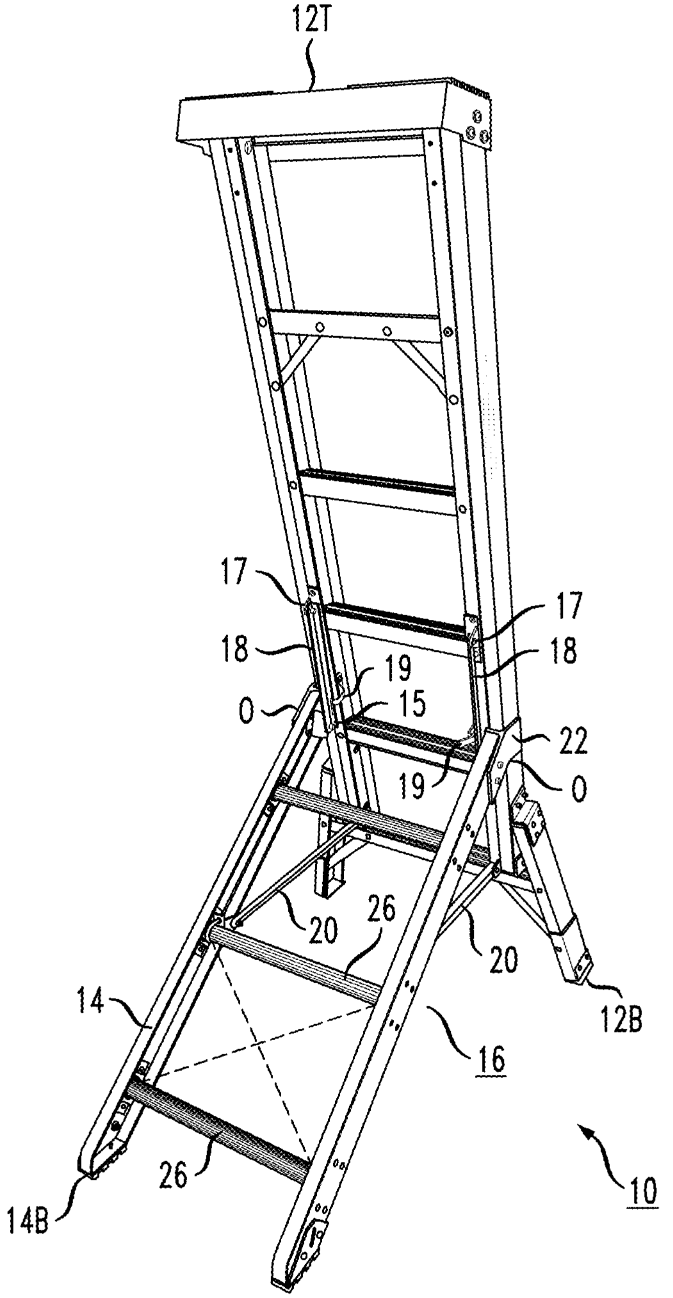
FIG. 4 is another side isometric view of the inventive safety ladder as shown in FIG. 3, in this case showing a view from the support leg perspective.

FIGS. 3 and 4 contain opposing isometric view of safety step ladder 10, particularly illustrating the various components described above. In particular, safety step ladder 10 is shown as being formed by a hinged combination of climb leg 12 and support leg 14, with support leg 14 attached to climb leg 12 via specialized hinging arrangement 16 in the form of a pair of rotatable link arms 18 and a pair of rotatable spreader bars 20. Rotatable link arms 18 and rotatable spreader bar 20 are attached between support leg 14 and climb leg 12 as shown. Specialized hinging arrangement 16 is shown as attached to climb leg 12 at a hinge position 15 (similar to position HP in FIG. 2) that is closer to the bottom 12B of climb leg 12 than the top 12T of this leg. In contrast to the known configurations of the prior art (where the climb leg and the support leg are hinged together at their top ends), the shifting downward of hinge position 15 provides the desired overhang of climb leg 12 without losing the required stability of the ladder itself.

In this particular embodiment as shown in FIGS. 3 and 4, climb leg 12 includes a wide stance stabilizer 13 as part of bottom termination 12B. As best shown in FIG. 4, stabilizer 13 is formed to extend a width W that is greater than the separation S of the side rails $12_1$, $12_2$ of climb leg 12. The inclusion of stabilizer 13 is considered to further solidify the arrangement of having climb leg 12 overhang support leg 14 by maintaining the center of gravity of the ladder user safely within the contact area of the ladder feet-to-the-ground to avoid ladder tip over. Also evident in the view of FIG. 4 is a set of bracing bars 26 that extend horizontally between sides $14_1$, $14_2$ of support leg 14. Other bracing arrangements are possible, including the use of cross-members that may form an X-like arrangement between sides $14_1$, $14_2$ (as shown in phantom in FIG. 4).

Figure 5:
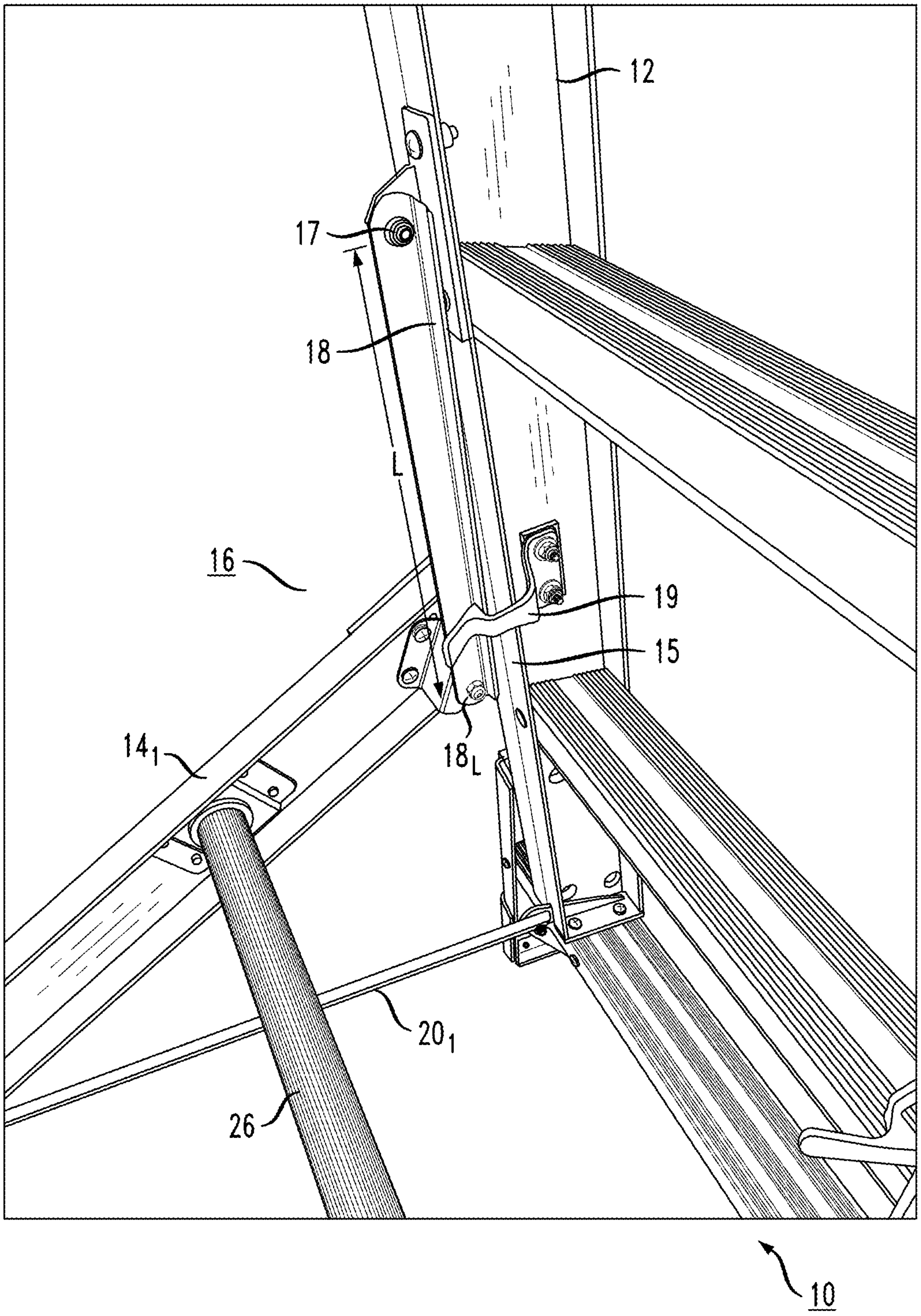
FIG. 5 is a close-up view of a portion of the view of FIG. 4, in this case clearly showing the individual components of the specialized hinging arrangement.
Figure 6:
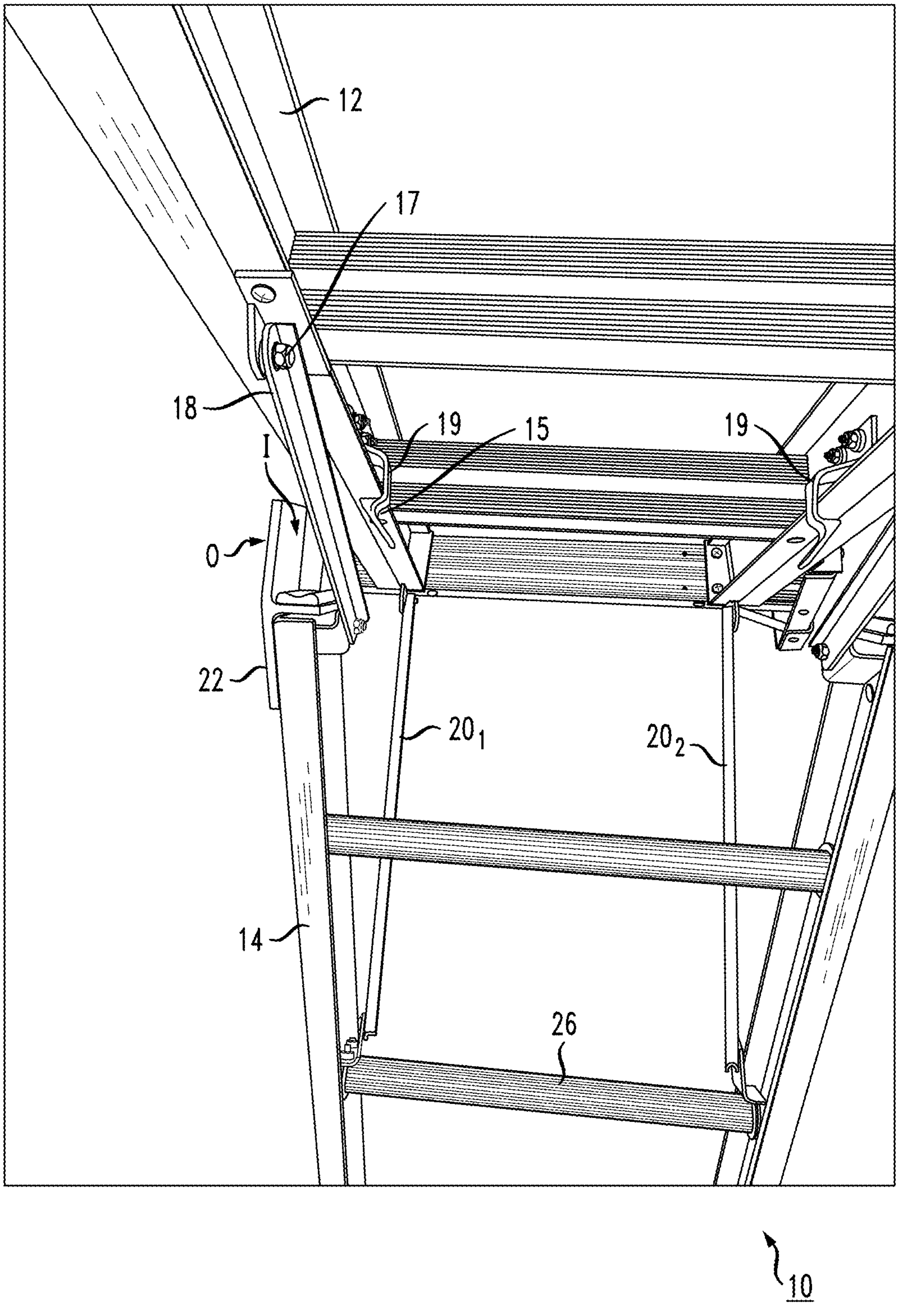
FIG. 6 is another perspective view of the elements of the specialized hinging arrangement as used to join the support leg to the climb leg of the inventive safety step ladder.

FIG. 5 is a close-up view of a portion of safety step ladder 10 as shown in FIG. 4, particularly illustrating the working relationship between rotatable link arm 181, rotatable spreader bar 201, climb leg 12 and support leg 14. In particular, rotatable link arm 181 is shown as attached between a top end termination 22 of support leg 14 and pre-defined joining location 17 on climb leg 12. In one exemplary embodiment as shown in FIG. 6, top end terminations 22 of support leg 14 may comprise a somewhat T-shaped element, so that climb leg 12 rests securely within an inner part I of top end termination 22 when safety step ladder 10 is in the open position, as better shown in FIGS. 3 and 4. In particular, this configuration of top end termination 22 substantially encloses climb leg 12 in this region and provides additional lateral support for safety step ladder 10 in the open position (i.e., restricts any possible lateral movement of climb leg 12 with respect to support leg 14). In particular, FIG. 6 (as well as FIGS. 3, 4, and 7) illustrates an outer surface plate "O" of top end termination 22, which is used to provide confinement for a positioned climb leg 12 and create this desired lateral support.

In the fully extended "open" position of FIG. 5 (which is also somewhat evident in the views of FIGS. 3 and 4), rotatable link arm 181 is in its "closed" position, with its lower end 18L (that is attached to end termination 22 of support leg 22) adjacent to climb leg 12 at hinge position 15. Rotatable link arms 18 are formed to have a length L, with its upper end attached to climb leg 12 at joining location 17. In particular, joining location 17 is chosen (in combination with hinge length L) such that when link arms 18 are closed they will come into contact with climb leg 12 at hinge position 15. In a preferred embodiment of the present invention, climb leg 12 is formed to include a pair of safety clips 19 that will maintain rotatable link arms 18 in place. As discussed below, safety clips 19 also serve to maintain spreader bars 20 in place against climb leg 12 when safety step ladder 10 is closed.

Figure 7:
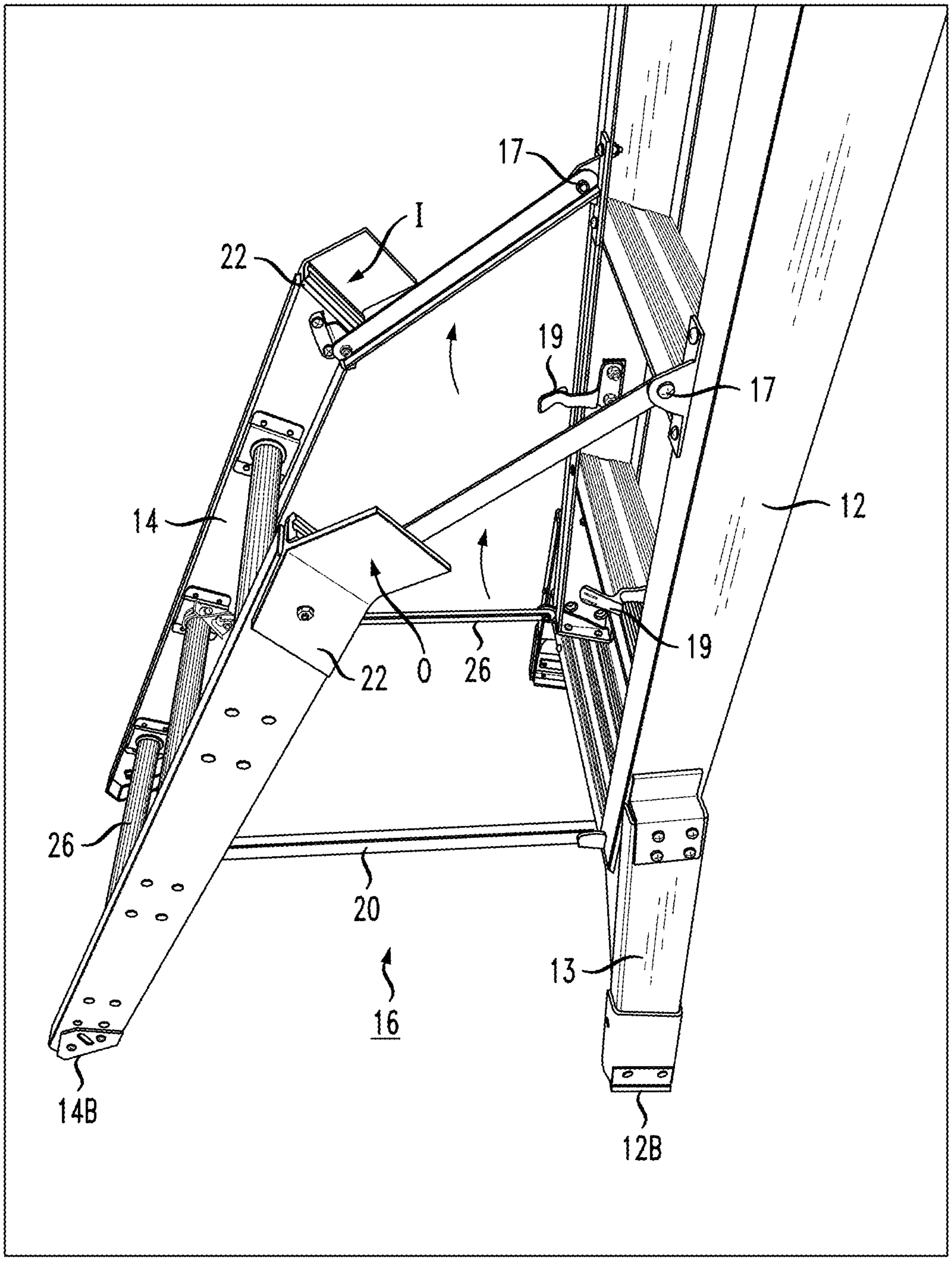
FIG. 7 is an isometric side view of the inventive step ladder, in this case illustrating the initial movement of the support leg away from the climb leg, as performed when closing the ladder.

As mentioned above, a significant aspect of the inventive safety step ladder is related to its hinging mechanism that allows for support leg 14 to be drawn up in a compact form against climb leg 12 when not in use. FIG. 7 illustrates an initial step in closing safety step ladder 10, where safety clips 19 are released, allowing rotatable link arms 18 to begin rotating upward. The arrows in FIG. 7 illustrate this movement.

Figure 8:
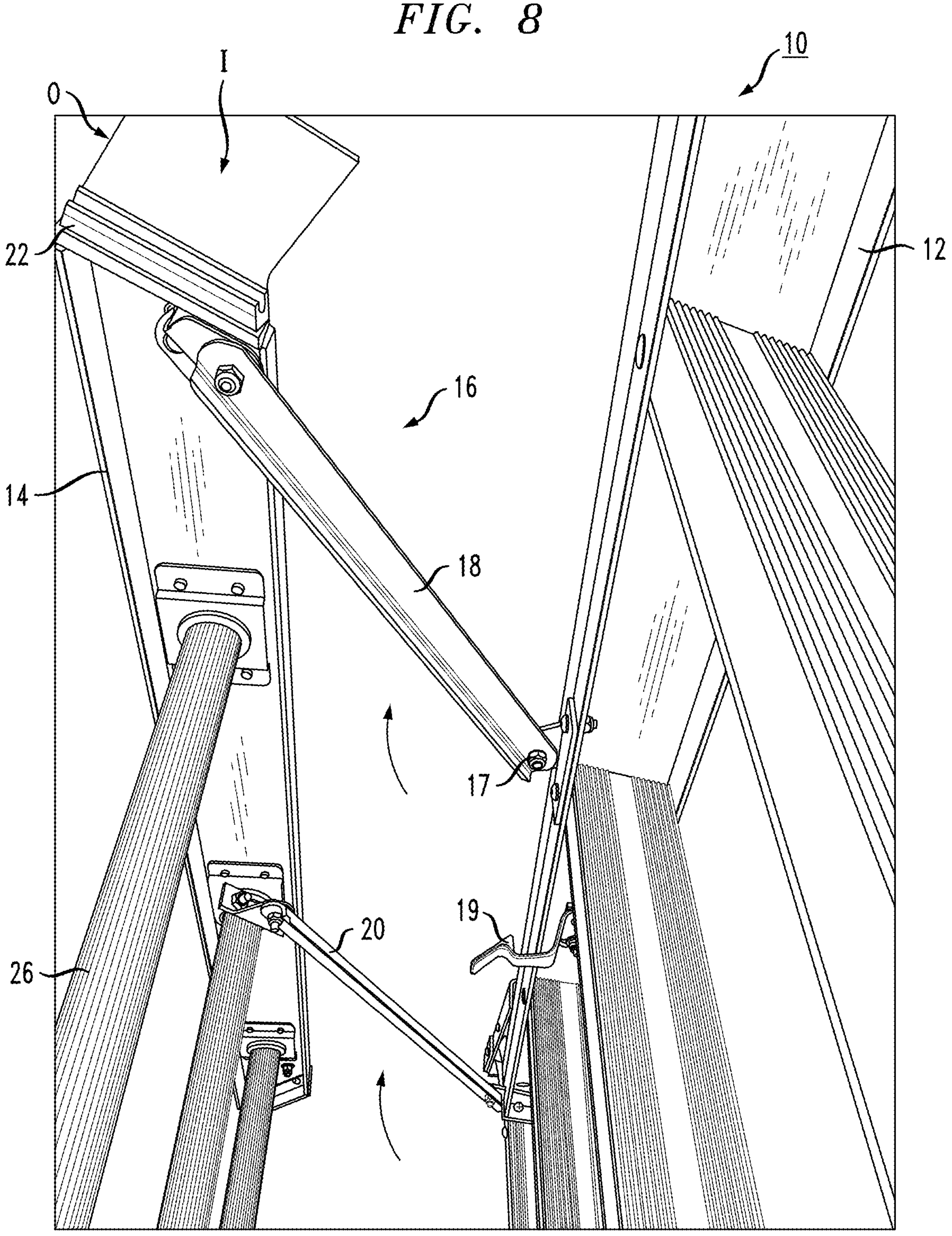
FIG. 8 is a close-up view of the movement of the specialized hinging arrangement during the process of closing the ladder, showing the movement of the rotatable link arms and rotatable spreader bars (components of the specialized hinging arrangement) when the ladder is being closed.

Rotatable link arms 18 continue to move upward as the ladder is closed, raising the bottom end 14B of support leg 14 above the ground location. Similar to rotatable link arms 18, spreader bars 20 rotate upward and assist in the movement of support leg 14 toward climb leg 12. Indeed, FIG. 8 illustrates this movement of support leg 14 closer to climb leg 12, with spreader bars 20 rotating clockwise (in this particular view), in combination with rotatable link arms 18, to pull support leg 14 in toward climb leg 12.

Figure 9:
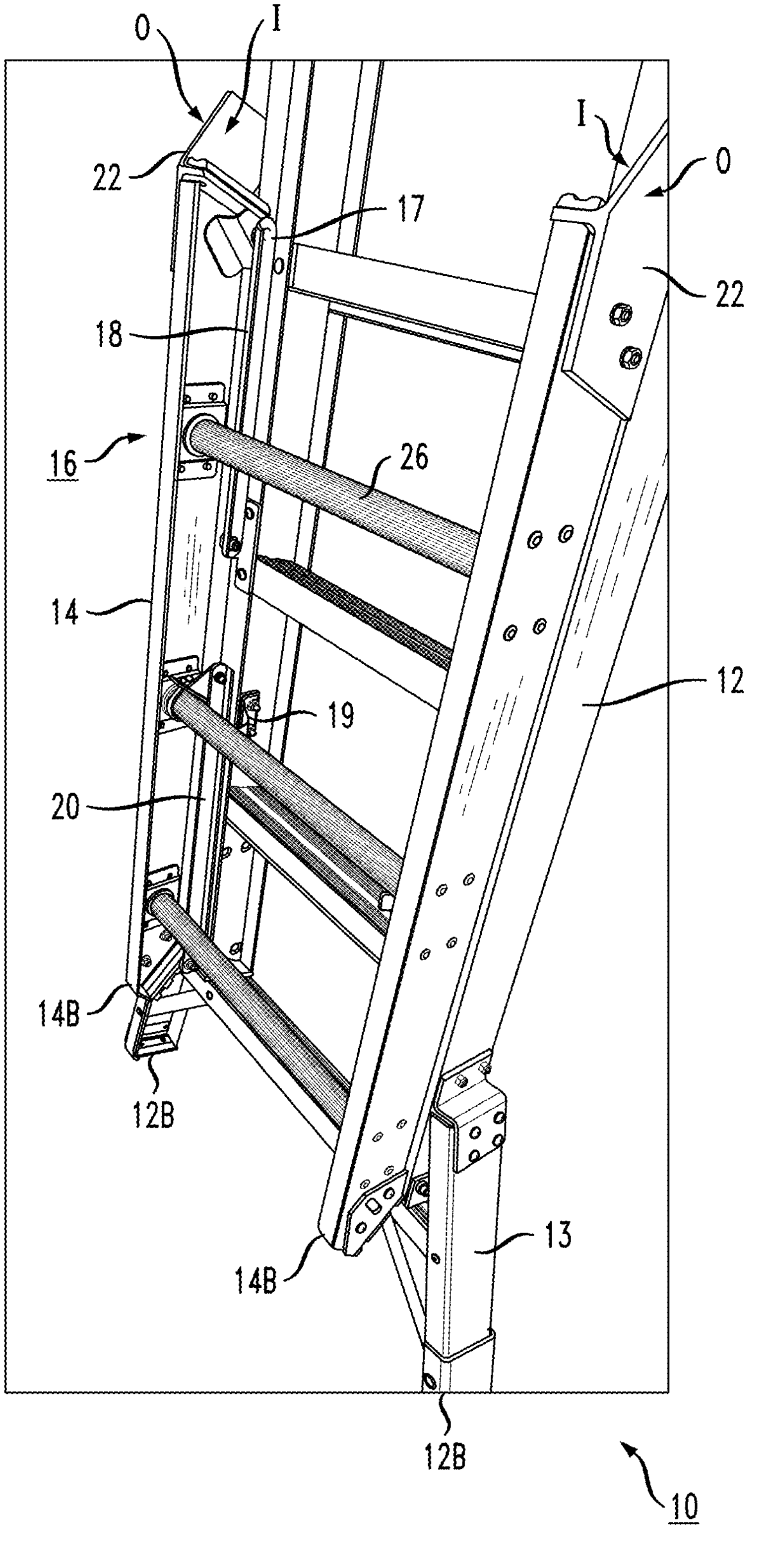
FIG. 9 is an isometric view of the inventive safety step ladder in the closed position, clearly illustrating the position of the support leg as adjacent to the climb leg, with the bottom of the support leg raised above ground level by virtue of the operation of the specialized hinging arrangement.

FIG. 9 illustrates safety step ladder 10 in the "closed" position, with support leg 14 positioned against climb leg 12. By virtue of using specialized hinging arrangement 16, support leg 14 moves upward as it is brought against climb leg 12 such that the bottom termination 14B of support leg 14 is slightly raised with respect to bottom termination 12B of climb leg 12. The ability to fold a ladder with different-sized legs in this manner is another distinct advantage of the present invention, since if a traditional hinge member were to be used, support leg 14 would extend below climb leg 12 when folded, making storage difficult (and perhaps unsafe as a result of the uneven weight distribution).

Figure 10:
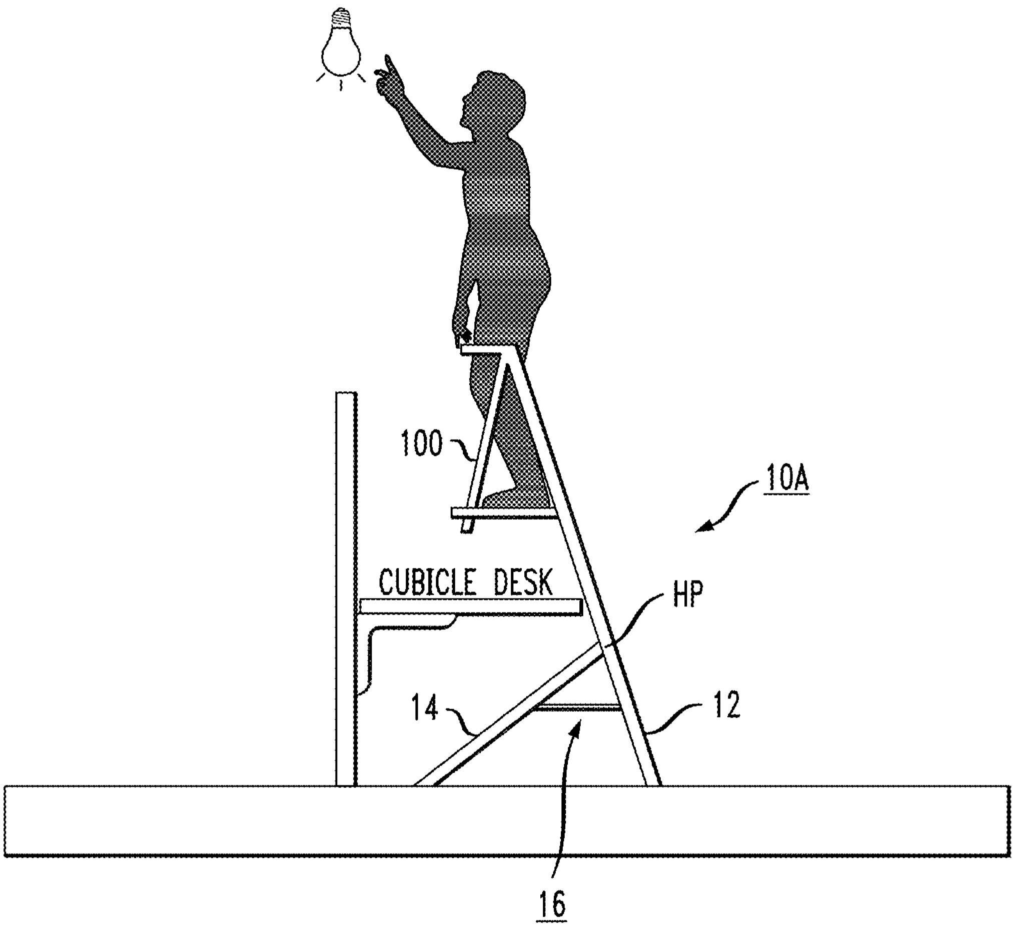
FIG. 10 is a simplified side diagram of another embodiment of the present invention, in this case incorporating a standing platform along the top region of the climb leg.

In addition to the above-described embodiments, it is possible to configure a safety step ladder of the present invention to include a platform component within the climb leg. FIG. 10 is a simplified side-view diagram, similar to that of FIG. 2, illustrating an inventive step ladder 10A that comprises a climb leg 12, support leg 14, and specialized hinging arrangement 16 that function in the same manner as described above. In this case, a platform assembly 100 is shown as incorporated within a top portion of climb leg 12, providing an additional area where a user may stand and safely reach out to overhead objects. In some cases, platform assembly may comprise a removable component, allowing for the inventive safety step ladder to be used either as illustrated in FIG. 2 or FIG. 10.

In all of these various configurations and embodiments, the ability to position the inventive safety step ladder so that the climb leg extends over an obstruction provides the ability for a user to reach over the obstruction in a safe manner.

What is claimed is:

1. A step ladder comprising a climb leg defined as comprising a top termination and an opposing ground termination, the climb leg including a hinging position closer to the ground termination than the top termination;

a specialized hinging arrangement; and a support leg attached to the climb leg at the hinging position by the specialized hinging arrangement such that when the support leg is fully extended by the specialized hinging arrangement, a top portion of the climb leg overhangs the support leg;

wherein the specialized hinging arrangement comprises a pair of rotatable link arms connected between upper terminations of the support leg and a connector location on the climb leg, the connector location disposed above the hinging position and determined, in combination with dimensions of the pair of rotatable link arms, to ensure that the bottom terminations of the support leg do not extend below the climb leg when the specialized hinging arrangement is in the closed position.

2. The step ladder as defined in claim 1 wherein the climb leg further comprises a wide stance stabilizer attached to a lower termination of the climb leg to define the opposing ground termination of the climb leg, the stabilizer having a width W greater than a separation S between side rails of the climb leg.

3. The step ladder as defined in claim 1 wherein the climb leg further comprises releasable clips for holding the pair of rotatable link arms against the climb leg when the step ladder is in the closed position.

4. The step ladder as defined in claim 3, wherein the specialized hinging arrangement further comprises a pair of rotatable spreader arms connected between the climb leg and the support leg at a position below the pair of rotatable link arms, the releasable clips for holding the pair of rotatable spreader arms against the climb leg when the step ladder is in the open position.

5. The step ladder as defined in claim 1 wherein the upper terminations of the support leg include bracket members for supporting portions of the climb leg when in the open position.

6. The step ladder as defined in claim 5 wherein the bracket members include an outer plate for capturing a portion of the climb leg in the open position, minimizing lateral movement of the climb leg with respect to the support leg.

7. The step ladder as defined in claim 1 wherein the step ladder further comprises a standing platform releasably attached to the top termination of the climb leg.

8. The step ladder as defined in claim 1 wherein the support leg further comprises a pair of opposing side rails and a plurality of bracing elements disposed between the pair of opposing side rails of the support leg.

* * * * *